(No Model.)

G. W. JOPSON.
CALIPERS.

No. 259,164. Patented June 6, 1882.

Witnesses:
J. N. Shumway
Jos. C. Earle

Geo. W. Jopson
Inventor
By atty
John E. Earle

UNITED STATES PATENT OFFICE.

GEORGE W. JOPSON, OF MERIDEN, CONNECTICUT.

CALIPERS.

SPECIFICATION forming part of Letters Patent No. 259,164, dated June 6, 1882.

Application filed November 28, 1881. (No model.)

*To all whom it may concern:*

Be it known that I, GEORGE W. JOPSON, of Meriden, in the county of New Haven and State of Connecticut, have invented a new Improvement in Calipers; and I do hereby declare the following, when taken in connection with the accompanying drawings and the letters of reference marked thereon, to be a full, clear, and exact description of the same, and which said drawings constitute part of this specification, and represent, in—

Figure 1:
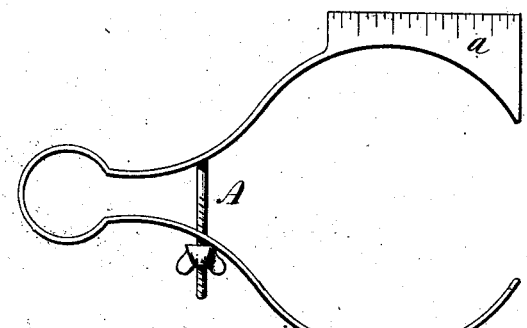
Figure 3:
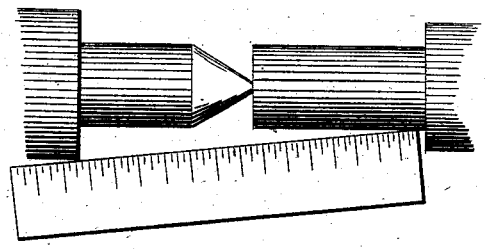
Figure 2:
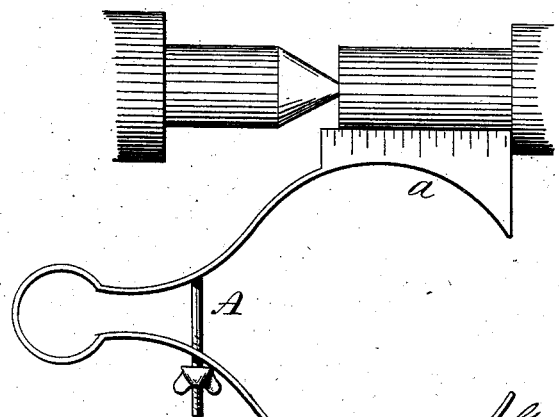

Figure 1, a side view; Figs. 2 and 3, illustrations to show the utility of the invention.

This invention relates to an improvement in calipers, such as used for metal and wood turning and like purposes. In such turning it frequently occurs that the workman is required to form a shoulder at a certain distance from the end of the cylinder being turned, and to attain such length he must measure while the thing being turned is in the lathe or be at the inconvenience of taking it out of the lathe. To make measurements at this point it is necessary that he should have a short measure, because if it be the usual three or four inch measure he cannot reach the point to apply the measure for the reason that the measure will come in contact with the mandrel of the lathe, as seen in Fig. 3. Hence it is customary for machinists to have at hand what they term an "inch-measure"—that is to say, a measure one inch long, properly graduated—so that they may apply it into the short space without coming in contact with the mandrel. In the use of the short inch-measure a serious difficulty is experienced by machinists because of the liability of this little measure being lost, and it is also inconvenient to handle because of being so small.

The object of this invention is to provide the caliper, which he necessarily uses when turning, with a measure which he can apply upon the short shoulder; and it consists in constructing the curved leg of the caliper with a straight-edged measure, as more fully hereinafter described.

A represents a pair of calipers of common construction—that is, with legs curved for outside calipering. (Here shown as spring-calipers.) On the outside of the curved leg I construct a projection which extends from the point of the leg upward, and so as to present a straight edge, as at *a*. This straight edge is graduated in the usual manner for graduating linear measures. By this construction the workman is enabled to use the measure for measuring the shoulder, the caliper itself giving length sufficient to make it convenient for handling and the curve of the leg permitting the application of the straight-edge down upon the cylindrical part of the thing to be measured without contact with the lathe-mandrel, as seen in Fig. 2. This illustration will be sufficient to show the utility of the invention and suggest its application to the various uses to which it is adapted.

I am aware that it is not new to graduate the legs of calipers and similar instruments, or to attach linear measuring devices to calipers, and therefore do not broadly claim such device; but What I do claim is—

A curved-leg caliper having a projection upon the outside of the leg presenting a straight graduated edge, substantially as described.

GEORGE W. JOPSON.

Witnesses:
GEORGE R. DESSUREAU,
CHAS. H. SHAW.